United States Patent [19]

Gigl et al.

[11] Patent Number: 4,518,659
[45] Date of Patent: May 21, 1985

[54] SWEEP THROUGH PROCESS FOR MAKING POLYCRYSTALLINE COMPACTS

[75] Inventors: Paul D. Gigl; Hyun S. Cho, both of Worthington, Ohio

[73] Assignee: General Electric Company, Worthington, Ohio

[21] Appl. No.: 536,221

[22] Filed: Sep. 23, 1983

Related U.S. Application Data

[63] Continuation-in-part of Ser. No. 364,714, Apr. 2, 1982.

[51] Int. Cl.$^3$ .................. B24D 3/10; C01B 21/64; B01J 3/06
[52] U.S. Cl. .................. 428/539.5; 75/231; 75/243; 75/244; 51/307; 51/309; 156/DIG. 68; 423/290; 423/446; 419/2; 419/11; 419/13; 419/26; 419/47
[58] Field of Search ............. 51/307, 309; 428/539.5; 75/243, 244, 231; 419/11, 13, 2, 26, 47, 48; 156/DIG. 68

[56] References Cited

U.S. PATENT DOCUMENTS

| 2,947,609 | 8/1960 | Strong . | |
|---|---|---|---|
| 3,233,988 | 2/1966 | Wentorf, Jr. et al. . | |
| 3,702,573 | 11/1972 | Nemeth . | |
| 3,743,489 | 7/1973 | Wentorf, Jr. et al. | 51/307 |
| 3,745,623 | 7/1973 | Wentorf, Jr. et al. | 407/119 |
| 3,767,371 | 10/1973 | Wentorf, Jr. et al. | 51/307 |
| 3,831,428 | 8/1974 | Wentorf, Jr. et al. | 72/467 |
| 3,868,234 | 2/1975 | Fontanella | 51/309 |
| 3,912,500 | 10/1975 | Vereschagin et al. | 419/11 |
| 4,063,909 | 12/1977 | Mitchell | 51/309 |
| 4,142,869 | 3/1979 | Vereschagin | 51/295 |
| 4,224,380 | 9/1980 | Bovenkerk et al. | 428/545 |
| 4,229,186 | 9/1980 | Wilson | 51/307 X |
| 4,288,248 | 9/1981 | Bovenkerk et al. | 419/2 |
| 4,481,180 | 11/1984 | Bedére et al. | 423/446 |

FOREIGN PATENT DOCUMENTS

| 1184 | 3/1979 | European Pat. Off. . |
| 79117 | 5/1983 | European Pat. Off. . |
| 1382080 | 1/1975 | United Kingdom . |
| 1478510 | 7/1977 | United Kingdom . |
| 1527328 | 10/1978 | United Kingdom . |
| 2048956 | 12/1980 | United Kingdom . |

Primary Examiner—Ben R. Padgett
Assistant Examiner—Matthew A. Thexton
Attorney, Agent, or Firm—Robert R. Schroeder

[57] ABSTRACT

The high pressure/high temperature catalyst sweep through process for making diamond and cubic boron nitride compacts has been improved by adding an intermediate metal or metal alloy. The added metal (whether alone or contained in an alloy) has a melting point below that of the catalyst (e.g. cobalt), is miscible with the catalyst, and preferably sweeps through the mass of abrasive crystals first. This modification has reduced flaw formation in such compacts.

31 Claims, 8 Drawing Figures 20,000 ELECTRON VOLTS 20,000 ELECTRON VOLTS 20,000 ELECTRON VOLTS

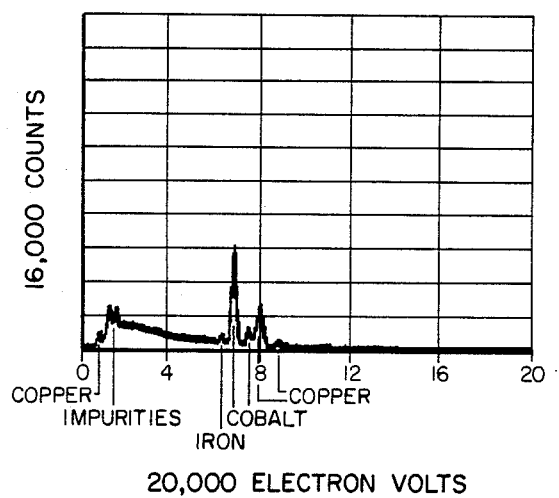

20,000 ELECTRON VOLTS 20,000 ELECTRON VOLTS

SWEEP THROUGH PROCESS FOR MAKING POLYCRYSTALLINE COMPACTS

This is a continuation-in-part of application Ser. No. 364,714 filed Apr. 7, 1982.

TECHNICAL FIELD

This invention is related to the high pressure/high temperature (HP/HT) process for making diamond and cubic boron nitride (CBN) compacts. More particularly, it is related to a modification of the HP/HT process which can result in increased yield in the production of such compacts through a reduction in the occurrence of defects, such as poorly sintered zones and irregularities.

BACKGROUND

A compact is a sintered polycrystalline mass of abrasive particles (e.g. diamond) bonded together to form an integral, tough, coherent, highstrength mass. A composite compact is a compact bonded to a substrate material, such as a cemented metal carbide (e.g. cobalt cemented tungsten carbide). The metal bonded carbide mass is generally selected from the group consisting of tungsten, titanium, tantalum carbides and mixtures thereof with metal bonding material therein normally being present in a quantity from about 6 to 25 weight percent and selected from the group consisting of cobalt, nickel, iron and mixtures thereof. Other metal carbides can be used.

Compacts or composite compacts may be used as blanks for cutting tools, drill bits, dressing tools, and wear parts. Compacts made in a cylindrical configuration have been used to make wire drawing dies (see U.S. Pat. No. 3,831,428).

One method for manufacturing diamond compacts involves the steps of:

A. placing within a protective shield metal enclosure which is disposed within the reaction cell of an HP/HT apparatus:
 (1) a mass of diamond crystals; and
 (2) a mass of catalyst metal or alloy containing catalyst metal in contact with the mass of diamond crystals; and B. subjecting the contents of the cell to conditions of temperature, pressure and time (typically at least 50 kbar, at least 1300° C. and 3–120 minutes) sufficient to give bonding between adjacent crystal grains.

The mass of catalyst metal could be in the form of a disc of one of the well known catalysts or an alloy containing at least one catalyst metal for diamond crystallization. Under the HP/HT condition, a wave of liquid metal advances through the dense diamond or CBN material, and the catalyst metal (in liquid form) makes itself available as a catalyst or solvent for recrystallization or diamond crystal intergrowth. The terms catalyst and catalyst/solvent are used interchangeably. This process is sometimes known as the sweep through method, i.e., the catalyst sweeps (or advances or diffuses) through the diamond mass.

The relative shapes of the abrasive mass and catalyst can be varied. For example, the mass of diamond can be cylindrical, and the catalyst can be an annular shape surrounding the cylinder of abrasive crystals or a disc on top of or below the diamond mass.

The source of catalyst may also be cemented metal carbide or carbide molding powder (which may be cold pressed to shape) wherein the cementing agent is a catalyst or solvent for diamond recrystallization or growth.

The catalyst is generally selected from cobalt, nickel and iron, but can be selected from any of the known catalysts which also include ruthenium, rhodium, palladium, platinum, chromium, manganese, tantalum or mixtures or alloys of catalysts. Catalyst may be mixed with the abrasive crystals in addition to or instead of being a separate mass adjacent to the abrasive crystals.

High temperature and high pressure in the diamond stable region are applied for a time sufficient to bond or sinter the diamond crystals together. The diamond stable region is the range of pressure temperature conditions under which diamond is thermodynamically stable. On a pressure-temperature phase diagram, it is the high pressure side, above the equilibrium line between diamond and graphite. The resulting compact is characterized particularly by diamond-to-diamond bonding, i.e., bonding between adjacent grains whereby there are parts of the crystal lattice which are shared between neighboring crystal grains (resulting from recrystallization at HP/HT conditions). The diamond concentration is preferably at least 70 volume percent of the diamond mass (i.e. excluding any substrate mass). Methods for making diamond compacts are detailed in U.S. Pat. Nos. 3,141,746; 3,745,623; 3,609,818; 3,831,428; and 3,850,591 (all of which are incorporated herein by reference).

Cubic boron nitrate compacts are manufactured in a similar manner to that just described for diamond. However, in making a CBN compact by the sweep through method, the metal swept through into the CBN crystal mass may or may not be a catalyst or solvent for CBN recrystallization. Thus a mass of polycrystalline CBN can be bonded to a cobalt cemented tungsten carbide substrate by sweep through of the cobalt ingredient into the interstices of the CBN mass under HP/HT conditions, even though cobalt is not a catalyst for CBN. This interstitial cobalt binds the polycrystalline CBN to the cemented tungsten carbide substrate. Nevertheless, the term catalyst will be used to describe the bonding or sintering metal swept into a CBN particle mass for the sake of convenience. In either the case of diamond or CBN composite compacts, the cobalt depletion of the substrate is not enough to be detrimental to the support function of the substrate.

The HP/HT sintering process for CBN is carried out in the CBN stable region which is the range of pressure and temperature conditions under which CBN is thermodynamically stable. CBN concentration is preferably at least 70 volume percent of the CBN mass. Methods for making CBN compacts are detailed in U.S. Pat. Nos. 3,233,988; 3,743,489; and 3,767,371, which are incorporated herein by reference. Crystal intergrowth or crystal-to-crystal bonding between neighboring CBN grains (as described for diamond compacts) is believed to be present.

The manufacture of thermally stable compacts is described in U.S. Pat. Nos. 4,288,248 and 4,224,380, (both of which are incorporated herein by reference). These patents teach the removal of substantially all of the metallic (catalyst) phase from compacts to yield a compact comprising selfbonded diamond or CBN particles with an interconnected network of pores dispersed throughout. Such compacts can withstand exposure to temperatures of about 1200° C. to 1300° C. without substantial thermal degradation, an advantage over the compacts of, for example U.S. Pat. No. 3,745,623 which are thermally degraded at a temperature of between about 700° C. and 900° C. Thermal degradation is indicated by a marked loss (e.g., 50%) in physical properties, such as decreased abrasion resistance, transverse rupture strength and modulus of elasticity with increasing temperatures. The metallic or catalyst phase is removed by acid treatment, liquid zinc extraction, electrolytic depletion or similar processes. The compacts of this type will be referred to throughout as thermally stable compacts.

Fine diamond feed material has always been difficult to sinter by the sweep through method. Generally, sintering becomes increasingly difficult as the feed material particle size decreases. One of the smaller sizes of diamond feed materials (particles having a nominal largest dimension of 4–8 microns) has been a problem for some time because its large surface area and small size causes difficulties when cleaning, handling or loading the fine powder into a reaction cell. However, it is also known that as the grain size of diamond compacts decreases, transverse rupture strength increases, thus giving compacts made with smaller particles an advantage. Under the high pressures (e.g. 50 kbar and greater) applied during the HP/HT process, such fine abrasive crystals compact resulting in a rather high packing density and a very fine pore structure. The resulting diamond mass, therefore, is dense and offers resistance to the percolation or sweep through of catalyst metal through the interstices.

Flaws develop in sintered diamond and CBN during the production of compacts. Examples of such flaws are poorly or non-uniformly bonded zones in the sintered diamond or CBN volume. Such flaws are characterized by: lower hardness than the non-flawed areas; high concentration of catalyst; less crystal to crystal bonding; different color from the non-flawed areas (gray as opposed to black for well sintered diamond); or different texture. In the case of cutting tool or wire die compacts, such flaws can sometimes be removed by mechanical means, such as lapping out the flawed area if it is near the surface. Since the inside of a wire drawing die does the drawing rather than an outside edge, as in the case of a cutting tool, the internal flaws are much more critical in a wire die. Consequently, any reduction in the frequency of poorly bonded zones is a worthwhile process improvement.

Another problem is the formation of shallow, metal and/or carbide filled pits in the diamond or CBN surface at the interface with the metal-carbide of a composite compact. These defects are exposed when the non-diamond or non-CBN material is removed in making such articles as thermally stable compacts (see U.S. Pat. No 4,224,380) or finished cutting tool inserts or blanks.

There is a relationship between the compact size and the micron size of the diamond or CBN raw material particles and the occurrence of flaws. Flaw frequency increases as particle size decreases for a given size compact. Flaw frequency also increases as compact size (i.e., the distance the catalyst/solvent must sweep through) increases. Thus the reduction of flaws is most critical in the case of relatively large compacts made with small (less than 10 micron) particles.

British Pat Nos. 1,478,510 and 1,527,328 discribe compacts of diamond and CBN respectively which are made with a bonding medium selected from a variety of materials which include intermetallic compounds of copper. Copper is also a known ingredient of metal bond powders for impregnated, metal matrix diamond tools. It is also a known coating metal for diamond.

The method described herein represents a new use for copper and other relatively lower melting metals in the HP/HT sweep through compact manufacturing process.

DISCLOSURE OF INVENTION

The HP/HT, sweep through process as previously described in the background section has been improved by placing in contact with the diamond or CBN mass an additional metal which: has a lower melting point than the catalyst; does not interfere with the function of the catalyst; and is miscible with the catalyst. Preferably, the lower melting additional metal sweeps through the diamond or CBN mass ahead of the catalyst. The lower melting metal may initially be mixed with the diamond or CBN; it may be placed in contact with the diamond or CBN mass at an open end of an annular support in the case of a typical wire die configuration; or it may be placed between the catalyst source and the diamond or CBN mass. For example, a copper sheet or disc (normally less than 250 microns thick) could be placed between a cobalt disc (or cobalt cemented tungsten carbide disc in the case of composite compacts) and the diamond or CBN mass. The catalyst metal sweeps the lower melting metal out and may alloy with it, leaving remnants (of for example copper) in the compact. Other metals beside copper which fall in the class of metals described are aluminum, zinc, tin, antimony and magnesium, when cobalt is the catalyst. Silver and lead were tried and did not work. A possible explanation is that they are immiscible with cobalt. Normally, most of the lower melting metal remnants would be at the surface farthest from where the catalyst source was during HP/HT processing thereby creating a concentration gradient of that metal through the resulting compact.

The amount of additional metal should be large enough to establish a sweep through of additional metal through the whole cross section of the diamond or CBN mass. The amount should not, however, be so much as to inhibit the catalyst sweep through or the functioning of the catalyst. When copper is used as the additional metal for example as a disc between the diamond and catalyst source and having the same diameter as the diamond mass, a preferred range of thickness is 25 to 250 microns of copper for a diamond layer about 4.3 mm thick.

Having a lower melting point than the catalyst, the lower melting metal becomes mobile before the catalyst (i.e., sooner during the heating of the HP/HT cell). The function of the intermediate material appears to be to move impurities on the surfaces or in the interstices of the diamond or CBN powder ahead of the advancing catalyst. It also seems to lubricate or aid the rearrangement and compaction of the diamond or CBN powder before sintering. This phenomenon may allow the abrasive powder to be more uniformly compacted ahead of the advancing catalyst metal, avoiding bridging.

Similarly, additional metal alloys may also be used so long as they do not interfere with the function of the catalyst. This includes alloys here termed non-catalytic alloys which do not contain a catalyst, have a lower melting point than the catalyst and are miscible with the catalyst. Also included are certain alloys here termed catalytic alloys which do not contain a catalyst. The catalytic alloys may beneficially serve as both catalyst source and as the additional metal or metal alloy.

Such catalytic alloys may be formed before HP/HT processing or may be formed in situ. They may be a simple catalyst-single metal alloy (e.g. 55% copper, 45% nickel) or a more complex combination of catalyst and other constituents (e.g., 10% cobalt, 50% copper 40% manganese). However, catalytic alloys for purposes of this invention must at least initially form a catalyst-lean liquid phase during the HP/HT process.

More specifically, it is known that certain alloys will undergo a phase dissociation during the melting process. Thus a liquid phase will initially be formed with a composition different than that of the solid phase. This dissociated liquid phase will become mobile before the remaining solid phase of the alloy. Tests indicate that such a mobile liquid phase may function as the intermediate material described above provided the liquid is catalyst-lean. That is, provided the dissociated liquid and solid phases are comparatively lean and rich, respectively, in the catalyst constituent of the alloy, and the catalyst does not form a major component of the liquid phase.

These tests included placing a disc of a 10% cobalt, 50% copper and 40% manganese alloy in contact with a mass of diamond crystals and subjecting the same to a temperature of about 1500° C. and a pressure of about 55 Kbar for 15 minutes. The resulting compact exhibited an increasing copper concentration gradient with a greater amount of copper at the end of the compact furthest from where the catalyst source has been. This is interpreted as evidence of an initial sweep through the diamond of a catalyst-lean alloy phase.

Another test compared compacts formed with a 55% copper-45% nickel alloy and compacts formed using a nickel catalyst without copper. Both compacts were subjected to HP/HT conditions of about 1500° C. and 55 Kbar for 15 minutes. Examination of the resulting compacts revealed a greater flaw frequency in the nickel-only compacts than in the compacts prepared with the Cu-Ni alloy. No copper concentration gradient as was found in the Co-Cu-Mn system noted above was discerned in a series of tests of the Cu-Ni system. This could be explained as reflecting a relatively swift sweep of the catalyst-lean phase followed by an equilibration of the alloy composition.

One preferred embodiment using such a catalytic alloy is in the manufacture of wire die blanks where such an alloy is placed in contact with diamond or CBN particles at an open end of a cemented carbide annulus support containing the particles. This embodiment may be especially useful in large diameter dies where the catalyst from the annulur support may have difficulty sintering the central portion of the particulate mass as described in co-pending application Ser. No. 313,119 of Cho, incorporated hereby by reference. In this embodiment the catalyst-lean phase functions as previously noted, while the catalyst itself supplements the catalyst from the annular support.

The sintered mass resulting from the claimed process can be finished by the normal methods to prepare a tool or die blank. The additional intermediate or lower melting metal must be active enough to remove or displace contaminants (e.g. air) and non-reactive or inert to the diamond or CBN powder and the catalyst used under the HP/HT conditions used.

BRIEF DESCRIPTION OF THE FIGURES

FIGS. 2A-C are energy dispersive X-ray spectra for several points through the cross section of the cylindrical diamond compact of FIG. 1. In each case, the total length of the vertical scale is 16,000 X-ray counts, and the total length of the horizontal scale is 20,000 electron volts. FIG. 2A indicates copper and cobalt concentration at the surface near the bottom of FIG. 1 which was next to the catalyst source. FIG. 2B indicates copper and cobalt concentration at a point near the middle of the sintered diamond in FIG. 1. FIG. 2C shows copper and cobalt concentration near the surface of the compact near the top of FIG. 1 which was furthest from where the catalyst source had been

FIGS. 4A, B, and C show cobalt concentration at points in the cross section corresponding approximately to those in FIGS. 2A, B, and C. No copper is indicated. It should be noted that FIGS. 4A and B have a vertical scale expanded to twice that of FIGS. 2A-C and 4C or 8,000 counts.

BEST MODE FOR CARRYING OUT THE INVENTION

Figure 1:
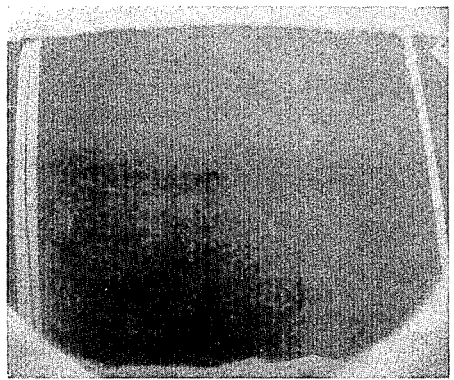
FIG. 1 is a photomicrograph (at 20×magnification) of a vertical cross section of a cylindrical diamond compact (about 5.3 mm diameter and 3.5 mm long) made by the process of this invention, using copper as the lower melting metal and cobalt as the catalyst.

One preferred form of HP/HT apparatus in which the compacts of this invention may be prepared is the subject of U.S. Pat. No. 2,941,248 (incorporated herein by reference) which is called a belt apparatus. It includes a pair of opposed cemented tungsten carbide punches and an intermediate belt or die member of the same material. The die member includes an aperture in which there is positioned a reaction vessel shaped to contain a charge assembly. Between each punch and the die there is a gasket assembly comprising a pair of thermally insulating and electrically nonconducting pyrophyllite members and an intermediate metallic gasket.

The reaction vessel, in one preferred form, includes a hollow salt cylinder. The cylinder may be of another material, such as talc, which (1) is not converted during HP/HT operation to a stronger, stiffer state (as by phase transformation and/or compaction) and (2) is substantially free of volume discontinuities occuring under the application of the high temperatures and pressures. Materials meeting the other criteria, set forth in U.S. Pat. No. 3,030,552 (Col. 1, line 59–Col. 1, line 2, incorporated herein by reference) are useful for preparing the cylinder.

Positioned concentrically within and adjacent to the cylinder is a graphite electrical resistance heater tube. Within the graphite heater tube, there is concentrically positioned a cylindrical salt liner. The ends of the liner are fitted with salt plugs disposed at the top and the bottom.

Electrically conductive metal end discs are utilized at each end of the cylinder to provide electrical connection to the graphite heater tube. Adjacent to each disc is an end cap assembly each of which comprises a pyrophyllite plug or disc surrounded by an electrically conducting ring.

Operational techniques for simultaneously applying both high pressures and high temperatures in this type of apparatus are well known to those skilled in the super-pressure art. The charge (or reaction zone) assembly fits within the space defined by the salt liner and the salt plugs. The charge assembly is comprised of a cylindrical sleeve and end caps of shield metal selected from the group consisting of zirconium, titanium, tantalum, tungsten and molybdenum. Within the shield metal sleeve are one or more sub-assemblies each defined by a shield metal disc and a shield metal cup.

The mass of abrasive diamond or CBN crystals is placed within the cavity defined by the cup and the disc and the diamond is lightly tamped into the cup. This mass may also contain graphite and/or a catalyst solvent. A disc of catalyst/solvent (e.g. cobalt) or material containing catalyst/solvent is usually placed on top of the abrasive crystal mass. In the case of CBN, aluminum alloy may also be placed in the subassemblies. That is, a disc or discs of aluminum and some other metal (usually nickel, cobalt, manganese, iron, vanadium or chromium) or preformed alloys of aluminum would be provided usually adjacent to the CBN particle mass.

The number of sub-assemblies within the reaction zone can be varied and is not critical. Each sub-assembly is usually separated by a separator disc made of an inert material such as dehydrated mica, hexagonal boron nitride or salt. The balance of the volume in the reaction zone assembly may be taken up with one or more discs made of the same material as the cylinder (e.g. pyrophyllite) and/or discs made of hexagonal boron nitride.

If composite compacts are desired, a mass of sintered metal bonded carbide (e.g. titanium, tungsten, or tantalum carbide) or carbide powder with appropriate metal bonding medium (e.g. cobalt, iron or nickel) would be placed within the sub-assemblies adjacent to the diamond or CBN. This would appear as a disc or layer either on top of or underneath the diamond crystal mass. If a wire drawing die type compact is desired, the inner mass of diamond is disposed within an annulus of cold pressed sinterable metal carbide powder from which catalyst (e.g. cobalt) sweeps through radially into the diamond. The annulus may be made of fully sintered metal bonded carbide. The manufacture of composite compacts is well known, and more details may be found in U.S. Pat. Nos. 3,745,623 and 3,831,428.

The charge assembly is loaded into the reaction vessel which is placed in the HP/HT belt apparatus. First, the pressure and then the temperature are increased and held at the desired conditions for sufficient time for sintering to occur. The sample is then allowed to cool under pressure for a short period of time, and finally the pressure is decreased to atmospheric pressure, and the compact is recovered.

The shield metal sleeve can be manually removed. Any adhering metal from the shield metal cup or disc can be ground or lapped off. Distortion or surface irregularity may be removed in the same manner.

After removal of any adhering cell materials from the compacts resulting from the HP/HT process, the recovered compacts comprise sintered polycrystalline diamond or CBN grains, and the interstices between the grains are occupied by a second phase comprising the catalyst/solvent. The second phase may also contain metal carbide. In order to make thermally stable compacts, this mass could be contacted first with a hot medium comprising nitric and hydroflouric acids (typically 1HF:1HNO$_3$ volume ratio mixture of boiling concentrated acids) and contacting it subsequently with a second hot medium comprising hydrochloric and nitric acids (e.g. boiling 3 HCl:1HNO$_3$). Leaching times may be as long as 12 days for the first acid leaching step and as long as six days for the second. Substantially all of the catalyst/solvent material infiltrated into the compact body would be removed by this process if it were carried out for a sufficient length of time in accordance with the teaching of U.S. Patent 4,224,380. The result would be thermally stable compacts.

The preferred method of this invention is to place a layer of the intermediate lower melting metal at the interface of the abrasive powder and the catalyst/solvent source within each subassembly prior to HP/HT processing. This invention was tested by placing copper in between and at the interface of diamond powder and cobalt layers in a typical charge assembly. Also, a charge assembly was run without the cobalt to determine the effect of copper alone. The cobalt sintered compact had a Knoop hardness comparable to commercially available diamond compacts and would not spall off when place in an acid leaching bath. This indicates diamond-to-diamond bonding. The compact from the other charge assembly without cobalt catalyst spalled when placed in the acid bath which indicated no or very little diamond-to-diamond bonding or sintering by the copper.

Figure 2A:
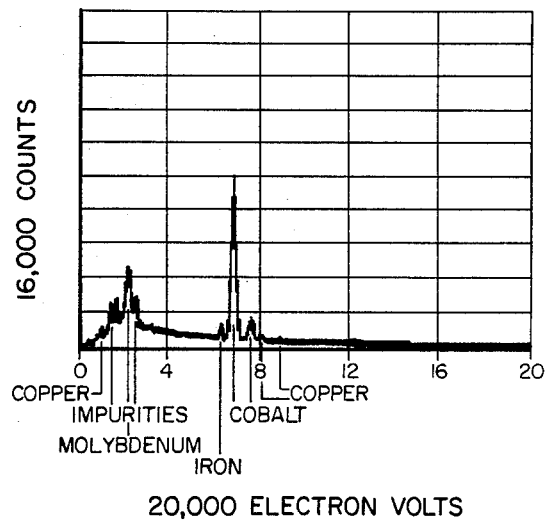
Figure 2B:
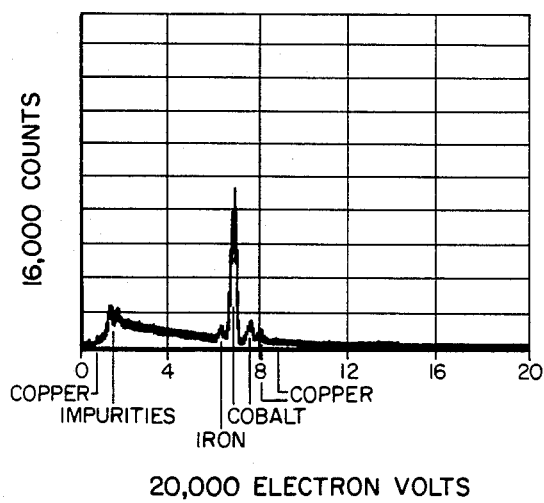
Figure 3:
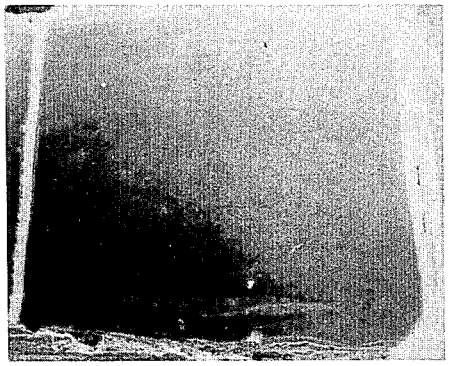
FIG. 3 is a photomicrograph (at 20×magnification) of a vertical cross section of a cylindrical diamond compact (about 5.3 mm long) made by the sweep through process using cobalt catalyst without the improvement described herein and evidencing an internal flow toward the bottom of the photo.
Figure 4A:
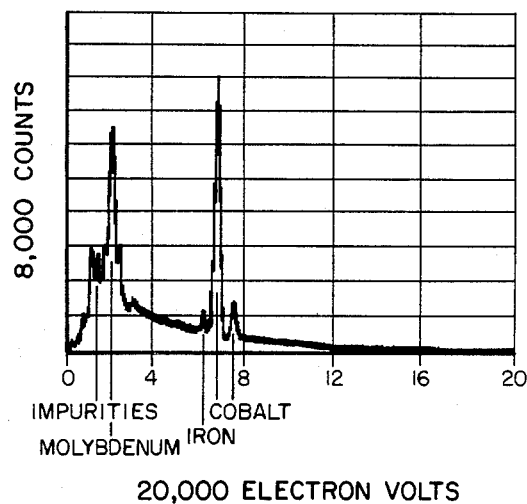
FIGS. 4A-C are energy dispersive X-ray spectra for several points through the cross section of the cylindrical diamond compact of FIG. 3.
Figure 4B:
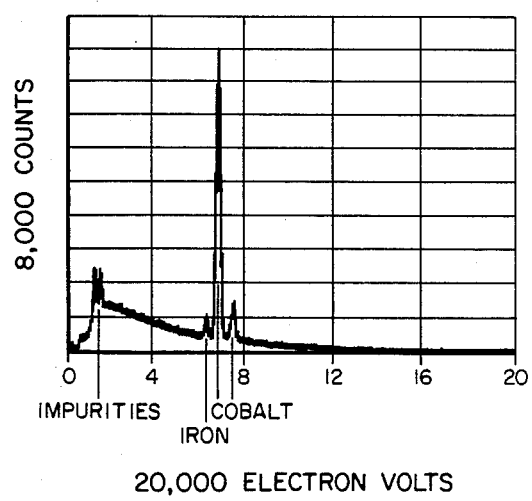
Figure 4C:
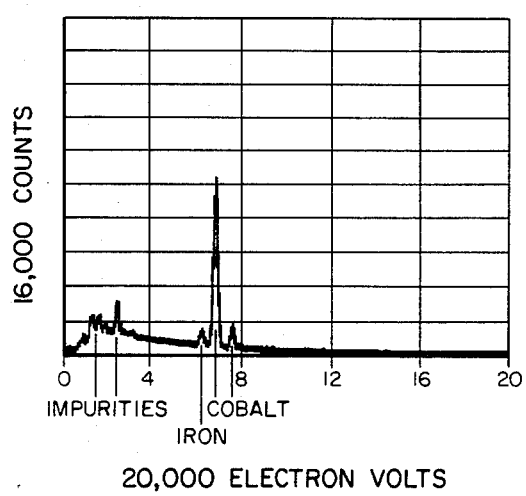

As determined by scanning electron microscope and energy dispersive analysis of X-rays (see FIGS. 1 and 2A-C), cobalt was the predominant metallic element throughout the bulk of the diamond mass. There was a copper concentration gradient with most of the copper at the end of the compact farthest from where the catalyst source had been. The copper peaks increase in height as one goes from FIG. 2A to 2C, showing the concentration gradient. The cobalt and iron shown are from the catalyst, and the molybdenum is from the shield metal. the impurities originate mostly from the grinding in preparation of the sample.

Since these experiments, a number of other tests have been made with and without metal carbide supports in order to confirm the quality of the sintered diamond masses. X-radiography indicates a relatively uniform cobalt distribution (see the figures) and a reduction in flow frequency. Using this technique, flaws were reduced from over 90% to less than five percent in the case of cylindrical compacts about 5.3 mm diameter and 3.5 mm long made with diamond having a nominal largest dimension of 4-8 microns. Also, the surface morphology indicates a reduction in the pit type of defects. This has the advantage of reducing the need to remove flawed areas from the tool blank compacts by grinding or lapping, and increases the yield of both tool blank and wire die type compacts.

Other embodiments of this invention will be apparent to those skilled in the art from a consideration of this specification or practice of the invention disclosed herein. Various omissions, modifications, and changes to the principles described herein may be made by one skilled in the art without departing from the true scope and spirit of the invention which is indicated by the claims.

We claim:

1. An improved process for making a polycrystalline diamond compact comprising subjecting a mass of diamond particles, which mass is in contact with a source of catalyst for diamond recrysallization, to a high pressure/high temperature process which results in a compact characterized by diamond-to-diamond bonding and containing an interstitial metal phase comprising catalyst; wherein the improvement comprises placing in contact with the mass of diamond particles an additional metal or metal alloy selected from the group consisting of:
(a) single metals and non-catalytic alloys of such metal which: (i) have a lower melting point than the catalyst; (ii) do not interfere with the function of the catalyst; and (iii) are miscible with the catalyst; and
(b) single metals and non-catalytic alloys of metals as described in (a) above in the form of catalytic alloys with the catalyst, which catalytic alloys do not interfere with the function of the catalyst and at least initially form a catalyst-lean liquid phase during the high pressure/high temperature process.

2. The improved process of claim 1 wherein the additional metal or metal alloy is mixed with the diamond.

3. The improved process of claim 1 which further comprises removing substantially all of the metal phase from the compact.

4. The improved process of claim 1 in which additional metal or metal alloy is selected from the group consisting of single metals and non-catalytic alloys of such metals which: (i) have a lower melting point than the catalyst; (ii) do not interfere with the function of the catalyst; and (iii) are miscible with the catalyst.

5. The improved process of claim 4 wherein the additional metal or metal alloy is placed between the diamond and the catalyst source.

6. The improved process of claim 5 in which the additional metal is a single metal which sweeps through the diamond mass ahead of the catalyst.

7. The improved process of claim 6 wherein the additional metal is selected from the group consisting of copper, tin, aluminum, zinc, magnesium and antimony.

8. The improved process of claim 7 wherein the additional metal is copper.

9. The improved process of claim 5 wherein the catalyst source is a mass selected from the group consisting of cemented metal carbide and carbide molding powders wherein at least part of the cementing agent is a catalyst.

10. The improved process of claim 4 wherein the catalyst source comprises a mass of material containing a catalyst which mass provides lateral support for the diamond particles, and wherein the additional metal or metal alloy is in contact with the particles at an open end of the supporting mass.

11. The improved process of claim 10 wherein the supporting mass is an annulus of cemented metal carbide or carbide molding powders and wherein at least a part of the cementing agent is a catalyst.

12. The improved process of claim 1 in which the additional metal or metal alloy is selected from the group consisting of single metals and noncatalytic alloys of such metals which: (i) have a lower melting point than the catalyst; (ii) do not interfere with the function of the catalyst; and (iii) are miscible with the catalyst and wherein said metals and metal alloys are in the form of catalytic alloys with the catalyst, which catalytic alloys do not interfere with the function of the catalyst and at least initially form a catalyst-lean liquid phase during the high pressure/high temperature process.

13. The improved process of claim 12 wherein the catalytic alloy is selected from the group consisting of alloys of cobalt and copper and alloys of nickel and copper.

14. The improved process as in claim 12 wherein the catalyst source comprises a mass of material containing a catalyst which mass provides lateral support for the diamond particles, and wherein the catalytic alloy is in contact with the particles at an open end of the supporting mass.

15. An improved process for making a polycrystalline cubic boron nitride compact comprising subjecting a mass of cubic boron nitride particles, which mass is in contact with a source of sintering catalyst, to a high pressure/high temperature process which results in a compact having at least 70 volume percent cubic boron nitride content and an interstitial metal phase comprising catalyst within the resulting polycrystalline mass; wherein the improvement comprises placing in contact with the mass of cubic boron nitride particles an additional metal or metal alloy selected from the group consisting of:
(a) single metals and non-catalytic alloys of such metals which: (i) have a lower melting point than the catalyst; (ii) do not interfere with the function of the catalyst; and (iii) are miscible with the catalyst; and
(b) single metals and non-catalytic alloys of metals as described in (a) above in the form of catalytic alloys with the catalyst, which catalytic alloys do not interfere with the function of the catalyst and at least initially form a catalyst-lean liquid phase during the high pressure/high temperature process.

16. The improved process of claim 15 wherein the additional metal or metal alloy is mixed with the cubic boron nitride.

17. The improved process of claim 15 which further comprises removing substantially all of the metal phase from the compact.

18. The improved process of claim 15 in which the additional metal or metal alloy is selected from the group consisting of single metals and noncatalytic alloys of such metals which: (i) have a lower melting point than the catalyst; (ii) do not interfere with the function of the catalyst; and (iii) are miscible with the catalyst.

19. The improved process of claim 18 wherein the additional metal or metal alloy is placed between the cubic boron nitride and the catalyst source.

20. The improved process of claim 19 in which the additional metal is a single metal which sweeps through the cubic boron nitride mass ahead of the catalyst.

21. The improved process of claim 20 wherein the additional metal is selected from the group consisting of copper, tin, aluminum, zinc, magnesium and antimony.

22. The improved method of claim 21 wherein the additional metal is copper.

23. The improved method of claim 19 wherein the catalyst source is a mass selected from the group consisting of cemented metal carbide and carbide molding powders wherein at least part of the cementing agent is a catalyst.

24. The improved process of claim 18 wherein the catalyst source comprises a mass of material containing a catalyst which mass provides lateral support for the cubic boron nitride particles, and wherein the additional metal or metal alloy is in contact with the particles at an open end of the supporting mass.

25. The improved process of claim 24 wherein the supporting mass is an annulus of cemented metal carbide or carbide molding powders wherein at least part of the cementing agent is a catalyst.

26. The improved process of claim 15 in which the additional metal or metal alloy is selected from the group consisting of single metals and noncatalytic alloys of such metals which: (i) have a lower melting point than the catalyst; (ii) do not interfere with the function of the catalyst; and (iii) are miscible with the catalyst, and wherein said metals and metal alloys are in the form of catalytic alloys with the catalyst, which catalytic alloys do not interfere with the function of the catalyst and at least initially form a catalyst-lean liquid phase during the high pressure/high temperature process.

27. The improved process of claim 26 wherein the alloy is selected from the group consisting of alloys of cobalt and copper and alloys of nickel and copper.

28. The improved process of claim 26 wherein the catalyst source comprises a mass of material containing a catalyst which mass provides lateral support for the cubic boron nitride particles, and wherein the catalytic alloy is in contact with the particles at an open end of the supporting mass.

29. The improved process of claim 28 wherein the supporting mass is an annulus of cemented metal carbide or carbide molding powders wherein at least part of the cementing agent is a catalyst.

30. A polycrystalline diamond or cubic boron nitride compact containing a catalyst and an additional metal or metal alloy within the interstices between crystal grains and in which compact there is a concentration gradient of the additional metal or metal alloy.

31. A polycrystalline compact as in claim 30 which has a first end and a second end and in which the concentration of additional metal and metal alloy is greater at one end than at the second end.

* * * * *